Patented Nov. 20, 1928.

1,692,696

UNITED STATES PATENT OFFICE.

WILLIAM JACKSON POPE, OF CAMBRIDGE, ENGLAND, ASSIGNOR TO THE BRITISH DRUG HOUSES LIMITED, OF LONDON, ENGLAND, A BRITISH COMPANY.

BENZAMINE BORATE AND PROCESS OF MAKING SAME.

No Drawing. Original application filed March 18, 1926, Serial No 95 785, and in Great Britain July 28, 1925. Divided and this application filed December 7, 1926. Serial No. 153,212.

This application is a division of my application, Serial No. 95,785, filed March 18, 1926, and relates to the manufacture of a compound for producing local anæsthesia, namely a benzamine (benzoyl vinyl diacetonalkamine) borate the chemical composition of which is such that one molecular proportion of benzamine is associated with five atomic proportions of boron, in the form of a complex boric acid; in some cases, especially if acetone is used in its preparation, solvent of crystallization may be included in its composition.

This borate is made by combining benzamine base with boric acid. In the preferred method chemical reaction between the base and boric acid is caused to occur in solution under such conditions that the borate eventually separates from the solution. The base is dissolved in a boiling organic solvent, such as acetone, and to the hot solution there is added a solution of boric acid, preferably in the required molecular proportion by weight, also in a boiling organic solvent, such as acetone. The whole is then cooled or allowed to cool, after filtration if necessary, whereupon the borate crystallizes. If the organic solvent employed retains in solution most or all of the borate of the anæsthetic base, the borate may be precipitated by addition of acetone, ether, or other suitable miscible solvent. The supernatant liquor is removed and the borate is then obtained in a state sufficiently pure for pharmaceutical use. In the event of the borate having a solubility of such an order that little or no separation of borate occurs after mixing the solutions, then concentration of the solution may be resorted to as a convenient method for obtaining the separation of the desired borate.

Other processes of manufacture which are chemically equivalent to the above, as for example double decomposition of the sulphate of the base with a barium salt of boric acid, may be employed.

By this method the sulphate of the base is mixed with an excess of a barium borate to remove the sulphuric acid from the sulphate of the base. The barium sulphate is filtered and thoroughly washed with alcohol. The clear filtrate is evaporated to a very low volume or to dryness and then thoroughly washed with acetone, or other suitable solvent, to give the desired borate.

The following example illustrates the invention, the parts being by weight:—

1·25 part of benzamine base, of which the structural formula is:

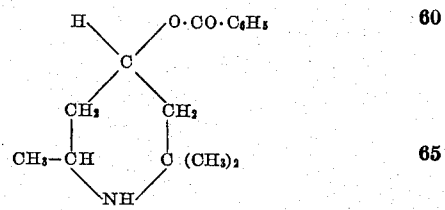

are dissolved in about 4 parts of acetone, and there is added to this a solution of 1·5 part of boric acid in 120 parts of boiling acetone, being five molecular proportions of baric acid to one molecular proportion of benzamine base. The borate separates on cooling and is filtered and washed with a little acetone. The product so obtained has a $P_H$ value of about 8·2 when freshly diluted with about 50 volumes of distilled water, and using phenol red solution as the indicator.

By another method, 2·47 parts of benzamine base are dissolved in N-sulphuric acid (10 parts approximately), and this solution is added to an aqueous suspension of a barium borate prepared by mixing 3·15 parts of crystalline barium hydroxide with 2·48 parts of boric acid. After warming for a short time the insoluble material is separated and washed with warm alcohol. The filtrate and washings are mixed and evaporated and the residue is washed with acetone, the solid separated and washed with more acetone. The $P_H$ value of the material so obtained is also about 8·2 when tested in the manner described above, again using phenol red as an indicator.

Having thus described the nature of the said invention and the best means I know of carrying the same into practical effect, I claim:—

1. As a new article of manufacture benzamine borate.

2. As a new article of manufacture benzamine borate having a composition of approximately one molecular proportion of benzamine to five molecular proportions of boric acid.

3. A process for the manufacture of a borate of benzamine which consists in causing benzamine to react with boric acid in the proportion of approximately one molecular proportion of benzamine to five molecular proportions of boric acid.

4. A process for the manufacture of a borate of benzamine, which consists in causing benzamine dissolved in a solvent to react with boric acid dissolved in a solvent.

5. A process for the manufacture of a borate of benzamine, which consists in causing benzamine dissolved in a solvent to react with boric acid dissolved in a solvent in the proportion of approximately one molecular proportion of benzamine to five molecular proportions of boric acid.

6. A process for the manufacture of a borate of benzamine, which consists in mixing hot solutions of benzamine and boric acid, allowing the mixture to cool and separating from the liquid the crystals which have been formed.

7. A process for the manufacture of a borate of benzamine, which consists in mixing hot solutions in acetone of benzamine and boric acid, allowing the mixture to cool and separating from the liquid the crystals which have been formed.

In testimony whereof I have signed my name to this specification.

WILLIAM JACKSON POPE.